United States Patent
De Maaijer et al.

(10) Patent No.: US 12,155,127 B2
(45) Date of Patent: Nov. 26, 2024

(54) MIMO ANTENNA SYSTEM AND METHOD

(71) Applicant: NXP B.V., Eindhoven (NL)

(72) Inventors: Lucas Maria Florentinus De Maaijer, Venlo (NL); Mustafa Acar, Eindhoven (NL); Paul Mattheijssen, Boxtel (NL)

(73) Assignee: NXP B.V., Eindhoven (NL)

( * ) Notice: Subject to any disclaimer, the term of this patent is extended or adjusted under 35 U.S.C. 154(b) by 281 days.

(21) Appl. No.: 18/051,941

(22) Filed: Nov. 2, 2022

(65) Prior Publication Data

US 2023/0261374 A1 Aug. 17, 2023

(30) Foreign Application Priority Data

Nov. 30, 2021 (EP) ..................................... 21211505

(51) Int. Cl.
*H01Q 3/34* (2006.01)
*H01Q 5/28* (2015.01)
*H04B 1/04* (2006.01)

(52) U.S. Cl.
CPC .................. *H01Q 3/34* (2013.01); *H01Q 5/28* (2015.01); *H04B 1/0475* (2013.01); *H04B 2001/0425* (2013.01)

(58) Field of Classification Search
CPC .......... H01Q 3/34; H01Q 5/28; H04B 1/0475; H04B 2001/0425; H04B 7/0617;

(Continued)

(56) References Cited

U.S. PATENT DOCUMENTS 9,225,290 B2 12/2015 Liou
9,813,085 B1 11/2017 Butler et al.
(Continued)

FOREIGN PATENT DOCUMENTS

WO 2016/126368 A1 8/2016
WO 2020/138830 A1 7/2020
WO 2020263852 A1 12/2020

OTHER PUBLICATIONS

U.S. Appl. No. 18/306,391, filed Apr. 25, 2023; 33 pages.
(Continued)

*Primary Examiner* — Sung S Ahn

(57) ABSTRACT

A multiple-input multiple-output (MIMO) antenna system for a mobile cellular network and method is described. The MIMO antenna system includes an array of dual-polarization patch antennas each having first and second polarization feed-points, a first polarization radio chain and a second polarization radio chain. The MIMO antenna system includes a beamformer coupled to the first and second polarization radio chains. The beamformer includes a beamformer channel for a respective feedpoint and further includes a transmit amplifier and a detector (coupler) coupled to a transmit amplifier output. In one mode of operation, a signal is transmitted via the first polarization feed-point of a dual-polarisation patch antennas and a replica of the transmitted signal may be sensed using the coupler at the output of the transmit amplifier and routed via the second polarization radio chain to a digital predistortion module. The digital pre-distortion module is configured to digitally pre-distort a signal for transmission dependent on the replica of the RF signal.

20 Claims, 7 Drawing Sheets

(58) Field of Classification Search
CPC ........ H04B 17/14; H04B 7/10; H04B 7/0413; H04B 7/086; G01S 7/025; G01S 7/03; G01S 13/42; H04L 5/0035; H04L 5/1469
See application file for complete search history.

(56) References Cited

U.S. PATENT DOCUMENTS

| | | | |
|---|---|---|---|
| 10,270,510 | B1 | 4/2019 | Wang et al. |
| 10,812,166 | B2 | 10/2020 | Kim et al. |
| 10,979,090 | B2 | 4/2021 | Rafique |
| 11,251,822 | B1 | 2/2022 | Gundel et al. |
| 2010/0166110 | A1 | 7/2010 | Neumann et al. |
| 2010/0248651 | A1* | 9/2010 | Dent ............... H04B 17/14 455/101 |
| 2012/0002752 | A1 | 1/2012 | Coan et al. |
| 2017/0279470 | A1* | 9/2017 | Lee ................ H03F 3/245 |
| 2018/0069309 | A1 | 3/2018 | Friedman et al. |
| 2020/0044362 | A1* | 2/2020 | Song ............... H01Q 5/30 |
| 2020/0067466 | A1 | 2/2020 | Kushnir |
| 2020/0411981 | A1 | 12/2020 | Kimball |
| 2021/0226653 | A1 | 7/2021 | Rafique |
| 2021/0377748 | A1 | 12/2021 | Baisch et al. |
| 2021/0399417 | A1 | 12/2021 | Lane et al. |
| 2022/0128504 | A1 | 4/2022 | Gopalakrishnan et al. |
| 2022/0166389 | A1 | 5/2022 | Hamid |
| 2023/0170945 | A1 | 6/2023 | De Maaijer et al. |
| 2023/0074376 | A1 | 9/2023 | Valdes Garcia et al. |
| 2024/0055765 | A1 | 2/2024 | Sakr |

OTHER PUBLICATIONS

S.Y. Kim et al: "A 76-84 GHZ 16-Element Phased Array Receiver with a Chip-Level Built-In-Self-Test System"; 2012 EEE Radio Frequency Integrated Circuits Symposium; 2012; 4 pages.
Brihuega, A., "Piecewise Digital Predistortion for mmWave Active Antenna Arrays: Algorithms and Measurements", IEEE Transactions on Microwave Theory and Techniques, vol. 68, No. 9, Sep. 2020.
Faruk, M., "Robust Single Polarization Coherent Transceiver Using DGD Pre-distortion for Optical Access Networks", Asia Communications and Photonics Conference (ACP), OSA2016, Nov. 2, 2016.
Liu, Y., "Digital Predistortion Utilizing Over-the-Air Feedback for Phased Arrays", IEEE Access, Digital Object Identifier 10.1109/ACCESS.2021.3063364, Mar. 2, 2021.
U.S. Appl. No. 18/052,965 NFOA dated Apr. 23, 2024; 26 Pages.
U.S. Appl. No. 18/306,391 NFOA dated Sep. 20, 2024; 25 pages.

* cited by examiner

MIMO ANTENNA SYSTEM AND METHOD

CROSS-REFERENCE TO RELATED APPLICATIONS

This application claims the priority under 35 U.S.C. § 119 of European Patent application no. 21211505.9, filed on 30 Nov. 2021, the contents of which are incorporated by reference herein.

FIELD

This disclosure relates to a multiple-input multiple-output (MIMO) antenna system and a method of operation of a MIMO antenna system.

BACKGROUND

Mobile communications cellular networks such as networks supporting 4G or 5G mobile communications standards may use base transceiver stations (BTS) or base stations including antenna systems which support MIMO communications using beamforming techniques to improve the network capacity and coverage.

These antenna systems include an array of antennas, typically implemented as patch antennas arranged in a regular rectangular grid. The pitch or spacing of the patch antennas is determined by the wavelength of the communications frequency used in transmission or reception. The patch antennas may be dual-polarization antennas which have orthogonal polarization to improve antenna diversity and allow the doubling of antenna elements for a given area.

In operation, beamforming and/or beam-steering is used both in transmit mode to focus the direction of the transmitted RF signal towards another BTS or a user equipment receiver (UE) for example a mobile phone and in receive mode to improve the sensitivity of a signal transmitted from a user equipment transmitter.

Beamforming requires multiple antennas to be operated in a transmit (TX) or receive (RX) mode. In transmit mode the phase and amplitude of the signal is adjusted for each of the relevant antenna to form the desired beam direction. In receive mode, the received signals from multiple antenna patches are combined using signal processing techniques to selectively receive signals from a desired beam direction and suppress unwanted signals.

The performance of a MIMO antenna may be improved by linearization of the antenna system. One method of linearization requires a replica of the transmit (TX) signal to be demodulated and compared to the original source signal in order to determine so-called predistortion coefficients. These predistortion coefficients are used to reshape (predistort) the source signal such that after the analog post processing the overall signal is linearized. The impact of linearization may be either better signal quality (measured in for example Error Vector Magnitude or another signal quality indicator) or lower power dissipation (by operating the system closer to its compression point)

SUMMARY

Various aspects of the disclosure are defined in the accompanying claims. In a first aspect there is provided a multiple-input multiple-output (MIMO) antenna system for a mobile cellular network, the antenna system comprising: an array of dual-polarized antennas, each dual-polarized antenna having a first polarization feed-point and a second polarization feed-point; a first polarization radio chain; a second polarization radio chain; a beamformer coupled to the first and second polarization radio chains, the beamformer having a plurality of first polarization beamformer channels and second polarization beamformer channels, each of the first polarization beamformer channels coupled to a first polarization feed-point of a respective dual-polarization antenna and each of the second polarization beamformer channels coupled to a second polarization feed-point of the respective dual-polarization antenna, wherein each beamformer channel comprises a transmit amplifier and a detector coupled to a transmit amplifier output; and wherein the MIMO antenna system further comprises: a digital predistortion module coupled to the first and second polarization radio chains; and a controller having a control output coupled to the beamformer; and wherein the controller is operable to control the beamformer in a first mode to: configure the beamformer to transmit or receive an RF signal via the respective first and second polarization feed-points; and in a second mode to: configure at least one first polarization beamformer channel to transmit an RF signal to a respective first polarization feed-point and to couple a detector output of the at least one first polarization beamformer channel to the second polarization radio chain; transmit an RF signal via the first polarization radio chain; detect a replica of the RF signal via the second polarization radio chain; and wherein the digital pre-distortion module is configured to digitally pre-distort a signal for transmission dependent on the replica of the RF signal.

In one or more embodiments, the MIMO antenna system may be configured as a time-division duplex (TDD) MIMO system and wherein the beamformer is configured in the first mode during a TDD time-slot and in the second mode in a guard band interval between TDD time-slots.

In one or more embodiments, the transmit amplifier may have a transmitter amplifier input configured to be switchably coupled to a respective one of the first polarization radio chain and the second polarization radio chain, and the transmitter amplifier output is configured to be switchably coupled to a respective one of the first polarization feed-point and the second polarization feed-point; and each beamformer channel further comprises: a receiver amplifier having a receiver amplifier input configured to be switchably coupled to a respective one of the first polarization feed-point and the second polarization feed-point and a receiver amplifier output configured to be switchably coupled to a respective one of the first polarization radio chain and the second polarization radio chain.

In one or more embodiments, the first polarization and the second polarization are mutually orthogonal.

In one or more embodiments, the first polarization is one of a horizontal polarization and vertical polarization and the second polarization is the other of the horizontal polarization and the vertical polarization.

In one or more embodiments, each beamformer channel may further comprise a first switch arranged to switchably couple the respective radio chain to either the transmitter amplifier input or the receiver amplifier output.

In one or more embodiments, each beamformer channel further comprises a second switch arranged to switchably couple either the transmitter amplifier output or the receiver amplifier input to a respective one of the first polarization feed-point and the second polarization feed-point.

In one or more embodiments, the MIMO antenna system may further comprise a further detection switch configured to switchably couple the second polarization radio chain to either the plurality of second polarization beamformer channels or a detection output of the first polarization beamformer channels.

In one or more embodiments, each of the first and second polarization radio chains may comprise a series arrangement of an up-down converter and a splitter between the digital predistortion module and the beamformer; wherein in a transmit mode, the up-down converter is configured to up-convert a signal from the controller and the splitter is configured to split the up-converted signal and provide the up-converted signal to the beamformer and in a receive mode, the splitter is configured to combine signals received from the beamformer and provide the combined signal to the up-down converter; and the up-down converter is configured to down-convert the combined signal.

In one or more embodiments, the MIMO antenna system may further comprise a digital front-end including the controller and further comprising a first and second polarization digital to analog converter and a first and second polarization analog to digital converter arranged between the controller and the respective first and second polarization radio chains.

In one or more embodiments, the digital pre-distortion module may comprise a digital input configured to receive a signal for transmission by the antenna system and a digital output configured to output a signal detected by the antenna system.

In one or more embodiments, during the second mode the digital pre-distortion module is further configured to: output a signal to the first polarization radio chain, and to receive an input signal from the second polarisation radio chain.

In a second aspect, there is provided a method of operating a multi-input multi-output, MIMO, antenna system for a mobile cellular network, the antenna system comprising: an array of dual-polarized antennas comprising a plurality of sub-arrays, each dual-polarized antenna having a first polarization feed-point and a second polarization feed-point, each sub-array comprising: a first polarization radio chain; a second polarization radio chain; a beamformer coupled to the first and second polarization radio chains, the beamformer having a plurality of first polarization beamformer channels and second polarization beamformer channels, each of the first polarization beamformer channels coupled to a first polarization feed-point of a respective dual-polarization antenna and each of the second polarization beamformer channels coupled to a second polarization feed-point of the respective dual-polarization antenna, and each of the first and second polarization beamformer channels comprising a transmit amplifier and a detector coupled to a transmit amplifier output; a digital predistortion module coupled to the first and second polarization radio chains; and wherein the method comprises: in a first mode configuring the beamformer to either a transmit an RF signal to the respective first and second polarization feed-points or receive an RF signal from the respective first and second polarization feed-points, and in a second mode: configuring at least one of the first polarization beamformer channels to transmit an RF signal to the respective first polarization feed-point and to couple at least one detector output of the at least one first polarization beamformer channels to the second polarization radio chain; transmitting an RF signal via the first polarization radio chain; detecting a replica of the RF signal via the second polarization radio chain; and digitally pre-distorting a signal for transmission dependent on the replica of the RF signal.

In one or more embodiments, the method may further comprise configuring the MIMO antenna system as a time-division duplex (TDD) MIMO antenna system; and configuring the beamformer in the first mode during a TDD time-slot; and configuring the beamformer in the second mode during a guard band interval between TDD time-slots.

In one or more embodiments, the method may further comprise, in the second mode: transmitting an RF signal via the first polarization radio chain; detecting a replica of the RF signal via the second polarization radio chain.

In one or more embodiments, the first polarization and the second polarization directions may be mutually orthogonal.

In a third aspect, there is provided a non-transitory computer readable media comprising a computer program comprising computer executable instructions which, when executed by a computer, causes the computer to perform a method of operating a multi-input multi-output, MIMO, antenna system for a mobile cellular network, the antenna system comprising: an array of dual-polarized antennas, each dual-polarized antenna having a first polarization feed-point and a second polarization feed-point; a first polarization radio chain; a second polarization radio chain; a beamformer coupled to the first and second polarization radio chains, each beamformer having a plurality of first polarization beamformer channels and second polarization beamformer channels, each of the first polarization beamformer channels coupled to a first polarization feed-point of a respective dual-polarization antenna and each of the second polarization beamformer channels coupled to a second polarization feed-point of the respective dual-polarization antenna, and each of the first and second polarization beamformer channels comprising a transmit amplifier and a detector coupled to a transmit amplifier output; a digital predistortion module coupled to the first and second polarization radio chains; and wherein the method comprises: in a first mode configuring the beamformer to either a transmit an RF signal to the respective first and second polarization feed-points or receive an RF signal from the respective first and second polarization feed-points, and in a second mode: configuring at least one of the first polarization beamformer channels to transmit an RF signal to the respective first polarization feed-point and to couple at least one detector output of the at least one first polarization beamformer channels to the second polarization radio chain; transmitting an RF signal via at the first polarization radio chain; detecting a replica of the RF signal via the second polarization radio chain; and digitally pre-distorting a signal for transmission dependent on the replica of the transmitted signal.

In one or more embodiments of the non-transitory computer readable media, the method may further comprise: configuring the MIMO antenna system as a time-division duplex, TDD, MIMO antenna system; and configuring the beamformer in the first mode during a TDD time-slot; and configuring the beamformer in the second mode during a guard band interval between TDD time-slots.

In one or more embodiments of the non-transitory computer readable media, the method may further comprise: during the first mode transmitting an RF signal via the first polarization radio chains; detecting a replica of the RF signal via the second polarization radio chain.

In one or more embodiments of the non-transitory computer readable media, the first polarization direction and the second polarization direction may be mutually orthogonal.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
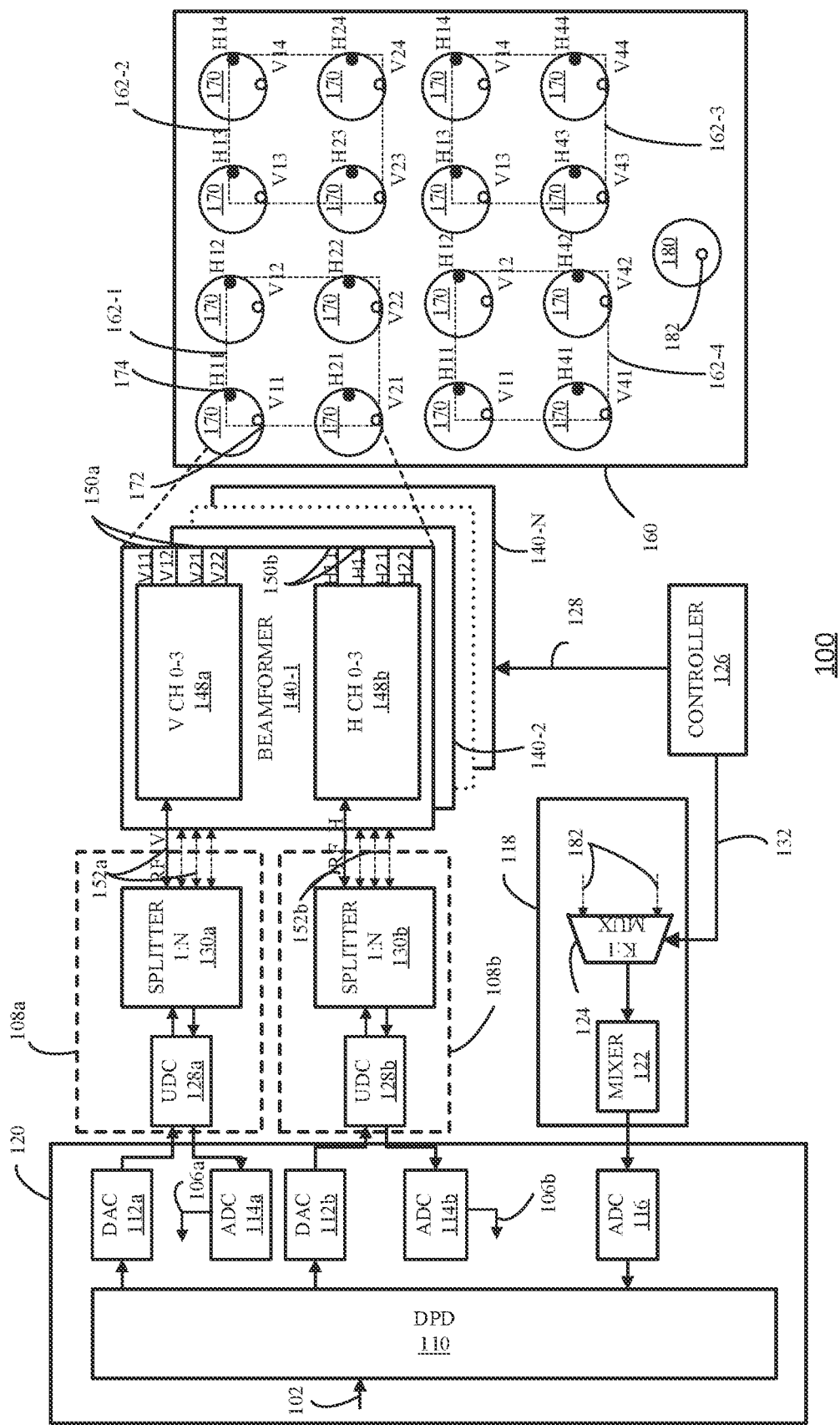
FIG. 1 shows an example MIMO antenna system with Digital Predistortion implemented through observation antennas and observation channels.

FIG. 1 shows a MIMO antenna system 100. The MIMO antenna system 100 includes a digital front-end 120, first and second radio chains 108a, 108b which may each consist of an up-down converter (UDC) 128a, 128b which may typically be implemented with a mixer but may also be implemented for example by up/down sampling. The first and second radio chains 108a, 108b may also include a splitter 130a, 130b. The MIMO antenna system 100 further includes a number N of beamformers 140-1, 140-2 to 140-N, an antenna panel 160, and a replica detector 118, and a controller 126. The digital front-end 120 includes a digital predistortion module 110 which may have a digital input 102 for receiving a signal to be transmitted via the antenna panel 160. The signal may be provided by a Modem (not shown) in the digital front-end 120. The digital front-end 120 may include transmit digital to analog converters (DACs) 112a, 112b having inputs connected to the digital predistortion module 110 and outputs connected to a respective UDC 128a, 128b. The digital front-end 120 may include receive analog to digital converters (ADCs) 114a, 114b having outputs 106a, 106b which may be connected to a Modem (not shown) and inputs connected to a respective UDC 128a, 128b. The digital front end 120 may also include a replica detector ADC 116 having an output connected to the digital predistortion module 110.

The antenna panel 160 consists of an array of dual-polarization antenna patches 170. A 4×4 array of patch antennas is illustrated but typically for a MIMO antenna system more patch antennas than illustrated will be included. An antenna patch 170 includes a first polarization feed-point 172 and second polarization feed-point 174. The first polarization and second polarization orientation are orthogonal. As illustrated the first polarization feed-point 172 is a vertical polarization feed-point 172 and the second polarization feed-point 174 is a horizontal polarization feed-point. The terms horizontal and vertical polarization as used herein may be considered to refer to two mutually orthogonal polarization directions. The horizontal and vertical feed-points are denoted by Hij and Vij where i is the row number and j is the column number of each patch antenna 170 in the antenna array 160. The orientation of the antenna patches 170 may be different than illustrated. The MIMO antenna system 100 is configured to transmit or receive a number of beams which typically may be 4 or 8 beams. Each beam may have an associated digital front end 120, radio chains 108a, 108b for each polarization, and a number of beamformers 140 dependent on how many antenna patches 170 are used for each beam.

The UDCs 128a, 128b may be connected to a respective splitter 130a, 130b. The UDCs 128a, 128b implement up down conversion in each radio chain. When providing a signal for beam forming, the splitters may split a signal received from the UDC 128a, 128b into N separate signals provided via connections 152a, 152b to beamformer channels 148a, 148b in each beamformer 140-1, 140-2, 140-N. Alternatively, when receiving the splitters 130a, 130b may combine N multiple signals received from each respective beamformer 140-1, 140-2, 140-N before they are provided to the UDC 128a, 128b. As illustrates beamformer 140-1 includes four vertical polarization beamformer channels 148a with connections 150a denoted V11, V12, V21, V22 to corresponding feed points 172 of a respective one of the patch antennas 170 in an antenna section 162-1. Beamformer 140-1 includes four horizontal polarization beamformer channels 148b having connections 150b denoted H11, H12, H21, H22 to corresponding feed points 174 of a respective one of the patch antennas 170 in antenna section 162-1. Similarly beamformers 140-2, 140-N have horizontal and vertical polarization beamformer channels (not shown) similarly connected to respective antenna sections. As illustrated, 4 beamformers are required (N=4) so one beamformer is connected to each of antenna-sections 162-1, 162-2, 162-3 and 162-4. In other examples, each beamformer may have fewer or more channels.

MIMO system 100 also has a replica detector 118 for the horizontal polarization channels 148a and the vertical polarization channels 148b. The replica detector 118 includes a series arrangement of a multiplexer 124 and mixer 122. The antenna panel 160 includes a number of replica antenna patches 180 for detecting a replica signal. The feed-point of each replica antenna patch 180 has a connection 182 to a respective one of the inputs of the multiplexer 124. It will be appreciated that only a subset of the antenna panel 160 is illustrated. For a number K replica antenna patches 180, the multiplexer 124 will have K inputs, one for each replica antenna 180 and an output connected to the mixer 122. The mixer output is connected to the input of the replica detector ADC 116. The controller 126 may have a control connection 128 to the beamformers 140-1, 140-2, 140-N and a control connection 132 to the replica detector multiplexer 124.

In operation the antenna system 100 may be configured to transmit a beamformed signal or to beamform a received signal. The beamformers 140-1, 140-2, 140-N may be configured in a transmit or receive mode by the controller 126 via control line 128. In a transmit mode of operation a signal received by the digital predistortion module 110 on input 102 may be converted to an analog signal by DACs 112a, 112b. The respective analog signals are up converted by UDCs 128a, 128b and then split to provide a vertical polarization RF signal (RF_V) and a horizontal polarization RF signal (RF_H) for each beamformer 140-1, 140-2, 140-N. As illustrated, the RF-V and RF_H signals may then be output from the beamformer 140-1 as four vertical polarization RF signals connected to four polarization feed-points V11, V12, V21, V22 and four horizontal polarization RF signals connected to four polarization feed-points H11, H12, H21, H22. The beam-formed signal is transmitted from antenna section 162-1. Similarly, the other beamformer devices output signals to corresponding antenna sections 162-2, 162-3, 162-4 respectively. Four antenna sections are illustrated, but it will be appreciated that in general there may be an antenna section corresponding to each beamformer 140-1, 140-2, 140-N. The resulting beam is transmitted from the antenna sections 162-1, 162-2, 162-3, 162-4.

During transmission, a replica signal may be detected via dedicated replica antenna patches 180 that detect a transmitted signal. The multiplexer 124 is controlled by the controller 126 to select which detected replica signal is used. The selected replica signal is then down mixed by mixer 122 and converted to a digital signal by replica detector ADC 116. The digital predistortion module 110 then may apply digital predistortion to a subsequent digital signal based on the received signal.

In a receive mode of operation, the beamformers 140-1, 140-2, 140-N may be configured to receive RF signals from the respective antenna section 162-1, 162-2, 162-3, 162-4 to preferentially receive a signal from a particular direction. The detected signals are then received via the beamformers and combined in the respective radio chains 108a, 108b. After down mixing (down converting) by the UDC 128a, 128b, the signals are converted to digital signals by receive ADCs 114a, 114b and then output on respective receive ADC outputs 106a, 106b to further circuitry (not shown) such as a Modem.

The MIMO antenna system 100 operates in a time division duplex (TDD) mode of operation. During each timeslot, the MIMO antenna system 100 is configured to select to transmit and/or receive a number of beams. A beamformed signal is transmitted or a received signal is beamformed in a particular time slot.

Figure 2:
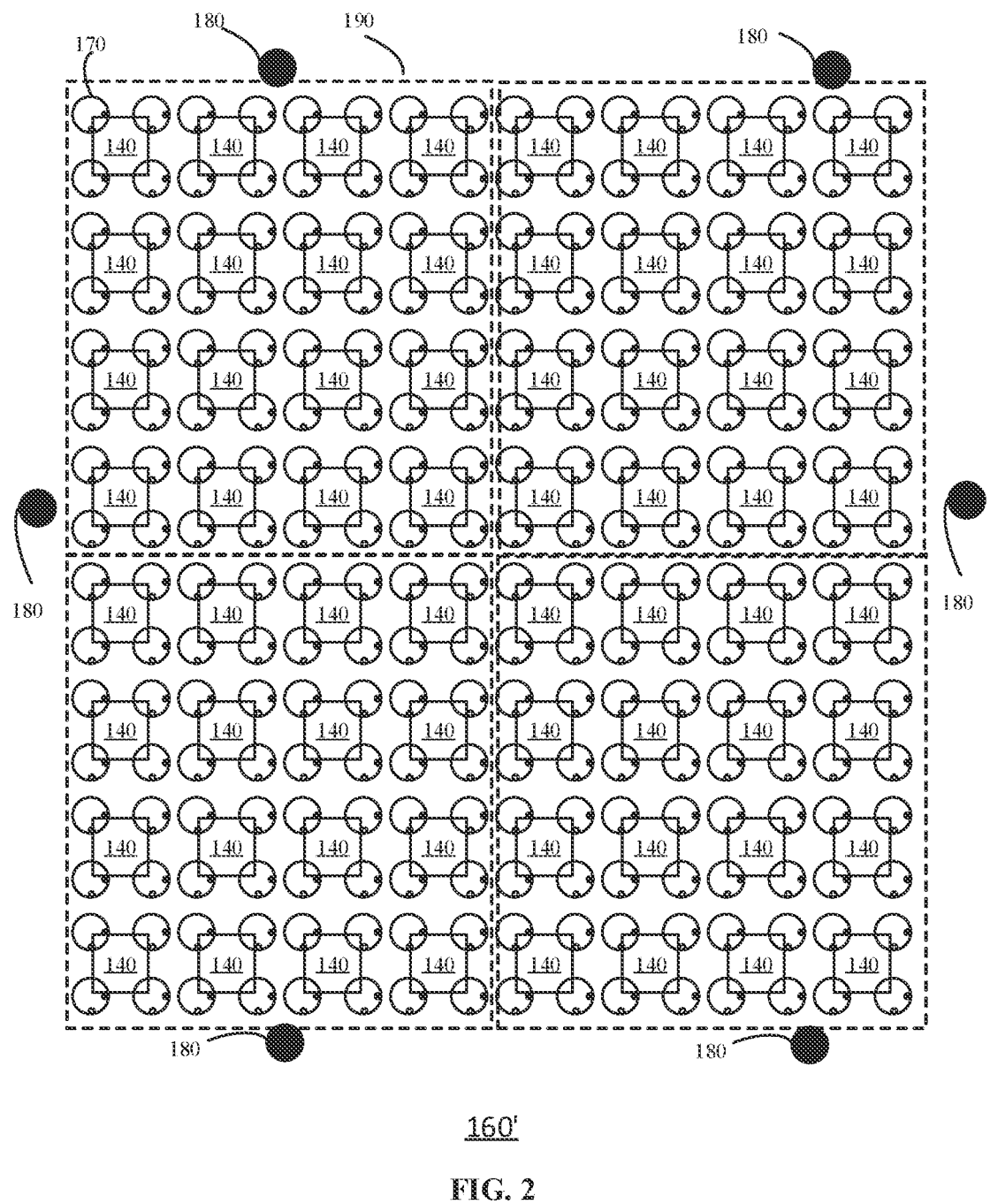
FIG. 2 shows a further detail of the example MIMO antenna system of Figure with observation antennas implemented at the edge of the antenna array.

FIG. 2 shows an antenna panel 160' consisting of a 16×16 array of dual-polarization antenna patches 170. Groups of dual-polarization antenna patches 170, in this example 4 patches are connected to a respective analog beamformer 140.

The antenna panel 160' may be configured in 4 sub-arrays 190 and so can support 4 beams. Each sub-array 190 has an associated radio chain and digital front-end. In this case a single mixer can drive all transmitter amplifiers with the same signal for each beam. Antenna panel 160' includes additional dedicated antennas 180 and signal routing for detecting the replica signal which adds to the complexity of the antenna system. These additional routing lines add to the already complex routing on the panel 160'.

Figure 3:
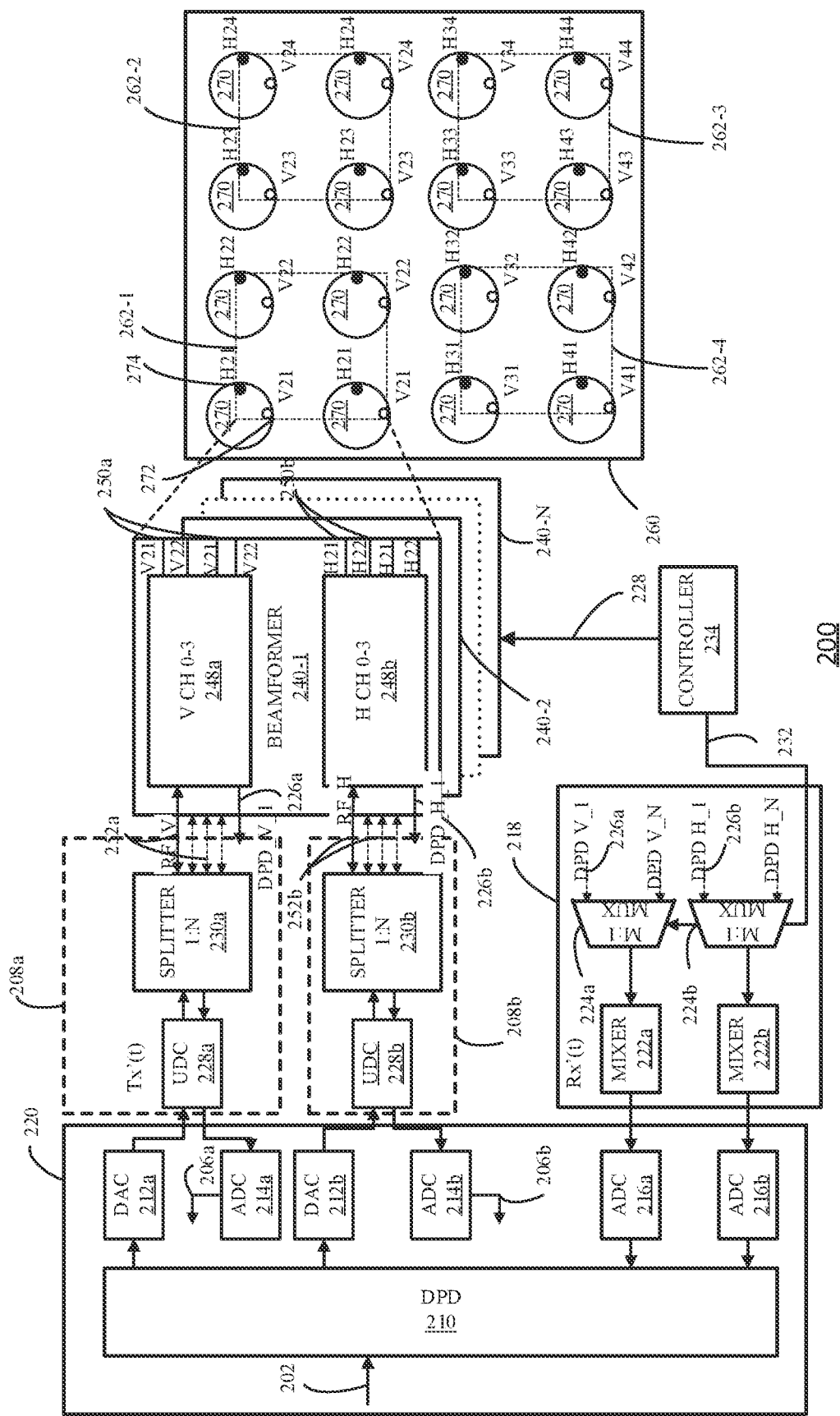
FIG. 3 illustrates an example MIMO antenna system with signal replicas extracted by using couplers and detectors and multiplexed to the observation channel.

FIG. 3 shows a MIMO antenna system 200. The MIMO antenna system includes a digital front-end 220, first and second radio chains 208a, 208b which may each consist of UDCs 228a, 228b, splitters 230a, 230b, beamformers 240-1, 240-2, 240-N, a controller 234, and an antenna panel 260. The digital front-end 220 includes a digital predistortion module 210 which may have a digital input 202 for receiving a signal to be transmitted via the antenna panel 260 which may be received from a Modem (not shown). The digital front-end 220 may include transmit digital to analog converters (DACs) 212a, 212b having inputs connected to the digital predistortion module 210 and outputs connected to a respective UDC 228a, 228b. The digital front-end 220 may include receive analog to digital converters (ADCs) 214a, 214b having inputs connected to a respective UDC 228a, 228b and outputs 206a, 206b which may be connected to a Modem (not shown). The radio chains 208a, 208b may be implemented in a similar way to radio chains 108a, 108b.

The UDCs 228a, 228b may be connected to a respective splitter 230a, 230b. The splitters may split a signal received from the UDCs 228a, 228b into separate signals provided via connections 252a, 252b to beamformer channels 248a, 248b in each beamformer 240-1, 240-2, 240-N. Alternatively the splitters 230a, 230b may combine multiple signals received from each beamformer before they are provided to the UDCs 228a, 228b. Beamformer 240-1 includes vertical polarization beamformer channels 248a consisting of four channels with connections 250a denoted V11, V12, V21, V22 to corresponding feed points 272 in the patch antennas 270 in antenna section 262-1. Beamformer 240-1 includes four horizontal polarization beamformer channels 248b connections 250b denoted H11, H12, H21, H22 to corresponding feed points 274 in the patch antennas 270 in antenna section 262-1. As illustrated, 4 beamformers are required (N=4) so one beamformer is connected to each of antennasections 262-1, 262-2, 262-3 and 262-4.

Further sub arrays (not shown) for additional beams will also have respective connections to further beamformers and digital front ends (not shown) similar to MIMO antenna system 100.

MIMO antenna system 200 has a replica detector 218 to provide an observation channel for the horizontal polarization channels 248a and the vertical polarization channels 248b. The replica detector 218 includes a series arrangement of a multiplexer 224a and mixer 222a for the vertical polarization channels and series arrangement of a multiplexer 224b and mixer 222b for the horizontal polarization channels. The multiplexers may be connected to control line 204 from the digital predistortion module 210. The controller 234 may have a control output 228 connected to the beamformers 240-1, 240-2, 240-N and a control output 232 connected to multiplexers 224a, 224b in the replica detector 218.

The vertical polarization beamformer channels 248a (V CH 0-3) have a power detector output 226a connected to an input of a multiplexer 224a. An output of multiplexer 224a is connected to an input of mixer 222a. The output of mixer 222a is connected to an input of replica detector ADC 216a in the digital front end 220. An output of the replica detector ADC 216a is connected to the digital predistortion module 210. The multiplexer 224a will have an input for each of the beamformers 240-1, 240-2, 240-N.

Similarly, the horizontal polarization beamformer channels 248b (H CH 0-3) have a power detector output 226b connected to an input of a multiplexer 224b. An output of multiplexer 224b is connected to an input of mixer 222b. The output of mixer 222a is connected to an input of replica detector ADC 216b in the digital front end 220. An output of the replica detector ADC 216b is connected to the digital predistortion module 210.

During transmission, the detection outputs 226a, 226b may be selected by the controller 234 from one of the respective beamformers 240-1, 240-2, 240-N. The detection signals (DPD_V_1 . . . DPD_V_N; DPD_H_1 . . . DPD_H_N) provided by a coupler at the output of a transmitter power amplifier (not shown) in a beamformer channel is then down converted by mixers 222a, 222b and converted to a digital signal by ADCs 216a, 216b. The digital predistortion module 210 may process the received signal and apply digital predistortion to the signal received at input 202 to improve the linearity of the MIMO antenna system 200. In other respects, the operation of the MIMO antenna system 200 is similar to MIMO antenna system 100.

Figure 4:
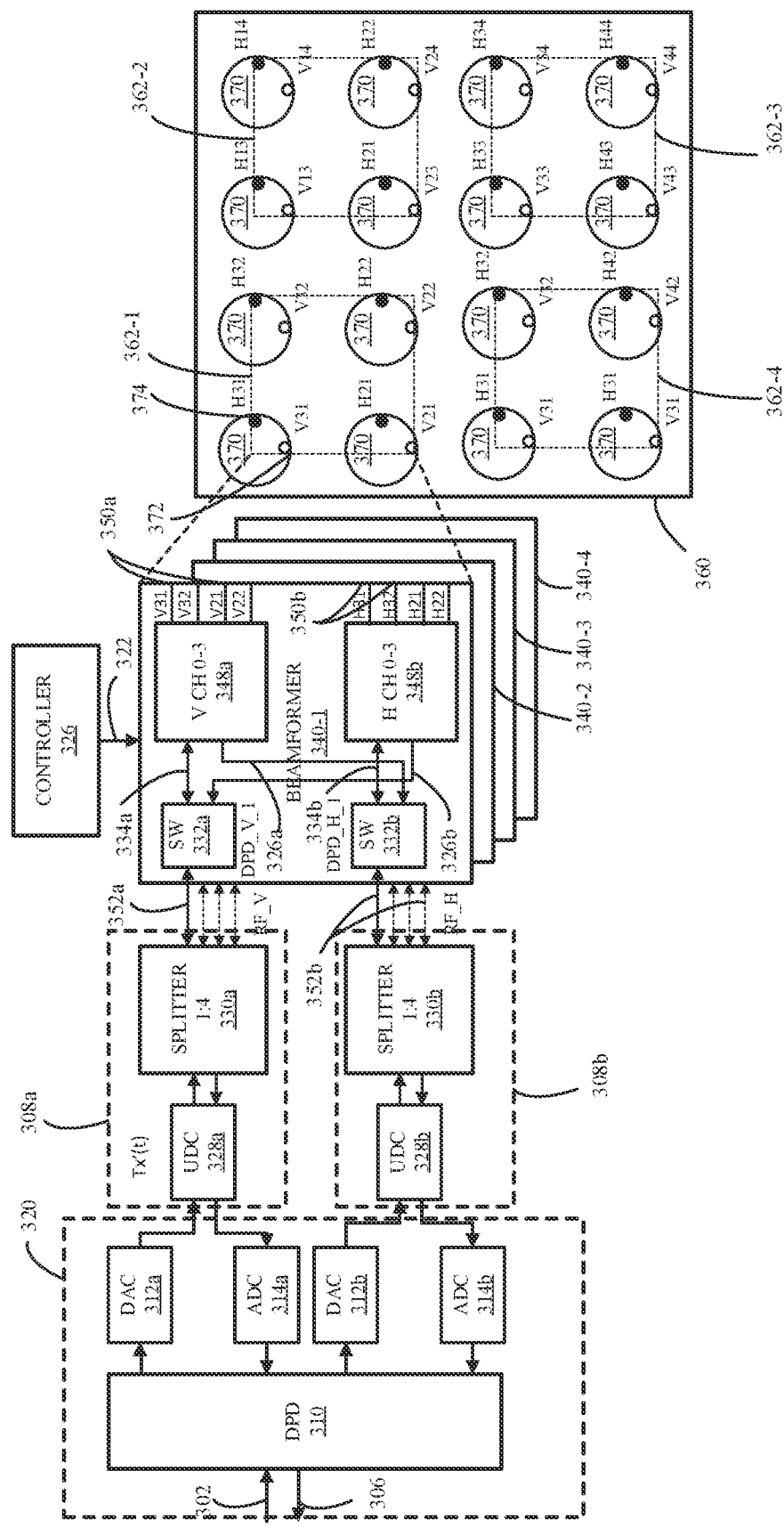
FIG. 4 shows a multiple-input-multiple output (MIMO) antenna system according to an embodiment.

FIG. 4 shows a MIMO radar system 300. The MIMO radar system includes a digital front-end 320, first and second radio chains 308a, 308b which may each consist of an up-down converter 328a, 328b and a splitter 330a, 330b, a beamformer including beamformer devices 340-1, 340-2, 340-3, 340-4 and an antenna panel 360. The digital front-end 320 includes a digital pre-distortion module 310 which may have a digital input 302 for receiving a signal to be transmitted via the antenna panel 360 and a digital output 306 for outputting a digital signal from a signal received via the antenna panel 360. The digital front-end 320 may include DACs 312a, 312b having inputs connected to the digital pre-distortion module 310 and outputs connected to a respective up-down converter 328a, 328b. The digital front-end 320 may include first analog to digital converter (ADCs) 314a, 314b having outputs connected to the digital pre-distortion module 310 and inputs connected to a respective up-down converter 328a, 328b. The MIMO system 300 may also include a controller 326. In some examples, the controller may be incorporated into the beamformer. In some examples, the controller 326 may be included in the digital front-end 320.

The up-down converters 328a, 328b may be connected to a respective splitter 330a, 330b. The splitters which may split a signal received from the up-down converter 328a, 328b into separate signals provided via connections 352a, 352b to beamformer channels 348a, 348b in each beamformer device 340-1, 340-2, 340-3, 340-4. Alternatively the splitters 330a, 330b may combine multiple signals received from each beamformer before they are provided to the up-down converters 328a, 328b. Beamformer device 340-1 includes vertical polarization beamformer channels 348a consisting of four channels with connections 350a denoted V11, V12, V21, V22 to corresponding feed points 372 in the patch antennas 370 in antenna section 362-1. Beamformer device 340-1 includes four horizontal polarization beamformer channels 348b with connections 350b denoted H11, H12, H21, H22 to corresponding feed points 374 in the patch antennas 370 in antenna section 362-1. Beamformer device 340-1 has first detection switch 332a having a first connection connected to the first radio chain 308a, a second connection 334a to the vertical polarization beamformer channels 348a, and third connection to the detector output 326b of one or more of the horizontal polarization beamformer channels 348b.

Beamformer device 340-1 has a second detection switch 332b having a first connection connected to the second radio chain 308b, a second connection 234b to the horizontal polarization beamformer channels 348b, and third connection to the detector output 326a of one or more of the vertical polarization beamformer channels 348a. In some examples, one of the first detection switch 332a and the second detection switch 332b may be omitted.

Similarly beamformers 340-2, 340-3, 340-4 have horizontal and vertical polarization beamformer channels (not shown) similarly connected to respective antenna sections 362-2, 362-3, 362-4. Further sub arrays (not shown) will also have respective connections to further beamformers (not shown).

The controller 326 may have a control output 322 connected to each of the beamformer devices 340-1, 340-2, 340-3 and 340-4.

Figure 5:
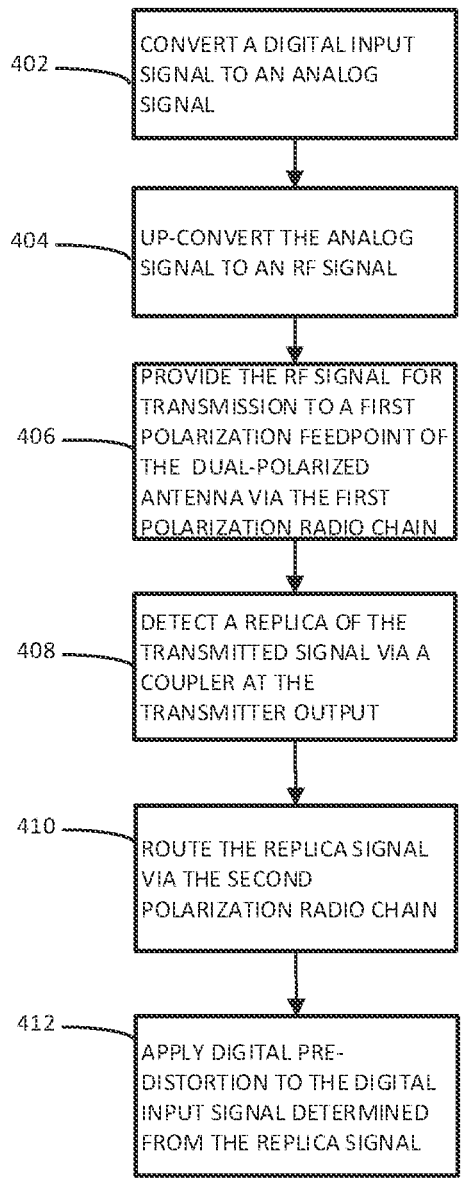
FIG. 5 shows a method of operating a multiple-input-multiple output (MIMO) antenna system of FIG. 4.

The operation of the MIMO antenna system 300 is described with reference to FIG. 5 which shows a method of operating a MIMO antenna system 400. In a normal or first mode of operation the digital pre-distortion module 310 may control the beamformers either to transmit a signal or receive a signal similarly to as already described for MIMO antenna system 100. In the first mode, the controller 326 may control the switches 332a, 332b to couple the respective radio chains 308a, 308b via connections 352a, 352b to the respective beamformer channels 348a, 348b via connections 334a, 334b. The beamformer channels 348a, 348b are coupled to the respective feed-points 372, 374 and configured to either transmit an RF signal to a dual-polarized antenna 370 or receive an RF signal from a dual-polarized antenna 370. In a second mode, the controller 326 may configure a dual-polarized antenna 370 in one or more antenna section 362-1, 362-2, 362-3, 362-4 to transmit a RF signal from only one of the feed-points for example vertical polarization feed-point 372. The controller 326 may then configure first detection switch 332a to couple the vertical polarization radio chain 308a to the vertical polarization channels 348a. The second detector switch 332b may be controlled by the controller 326 to connect the detector output 326b of the vertical polarization channels 348a to the horizontal polarization radio chain 308b. It will be appreciated that this configuration can be reversed so that the horizontal polarization channels 348b are used for transmission and the first (vertical polarization) radio chain 308a is coupled to the detector output of the horizontal polarization channels 326b by the first detector switch 332a.

In the second mode, in step 402 a digital input signal received by the digital pre-distortion module 310 may be converted to an analog signal which is then provided to the radio chain 308a. In step 404, the radio chain 308a may then upconvert the signal to an RF signal. In step 406 the RF signal is provided to the connected to the vertical polarization beamformer channels 348a and to a respective dual-polarized antenna 370 via feed-point 372. In step 408, a transmitted signal from the output of the transmit amplifier may be detected by a coupler or detector at the transmitter amplifier output. In step 410, the detected signal is then fed back to the digital pre-distortion module 310 via the second radio chain 308b which is not being used for transmission. This detection signal is effectively a replica of the transmitted signal which may then be used in a digital predistortion process by digital pre-distortion module 310 in step 412 to digitally pre-distort subsequently transmitted signals. In some examples, the MIMO antenna system 300 is configured as a TDD antenna system. In some examples for TDD antenna systems, the first mode of operation may be configured during a TDD time-slot and the second mode may be configured in a guard band interval between TDD time-slots. In other examples both the first and second modes by configure during TDD time-slots.

The inventors of the present disclosure have appreciated that the antenna system can be configured to measure a replica signal by using a coupler, which is available at the output of the transmit amplifier of each beamformer, to detect a replica of the transmit signal. This replica signal is then fed back via the second radio chain without any further additional hardware or routing so eliminating the need for a separate replica detection circuitry, for example replica circuitry 118. The antenna system 400 may reduce the number of signals that are routed on the antenna panel which may result in a more compact design.

In some examples, different modes of coefficients determination may be possible. For example all transmit channels on 1 area in transmit mode, coupled with all receive channels in receive mode may be used to determine a weighted sum for all antennas.

Compared to prior art examples using an observation antenna, the replica signal is better defined as it is taken from the output of the respective transmit amplifier. This may be used to more accurately apply predistortion to an input signal which may improve the quality of a transmitted signal. The antenna system 300 may therefore allow a more accurate observation of the replica signal, resulting in improved linearity of the system when digital pre-distortion is applied by the digital pre-distortion module 310.

Figure 6:
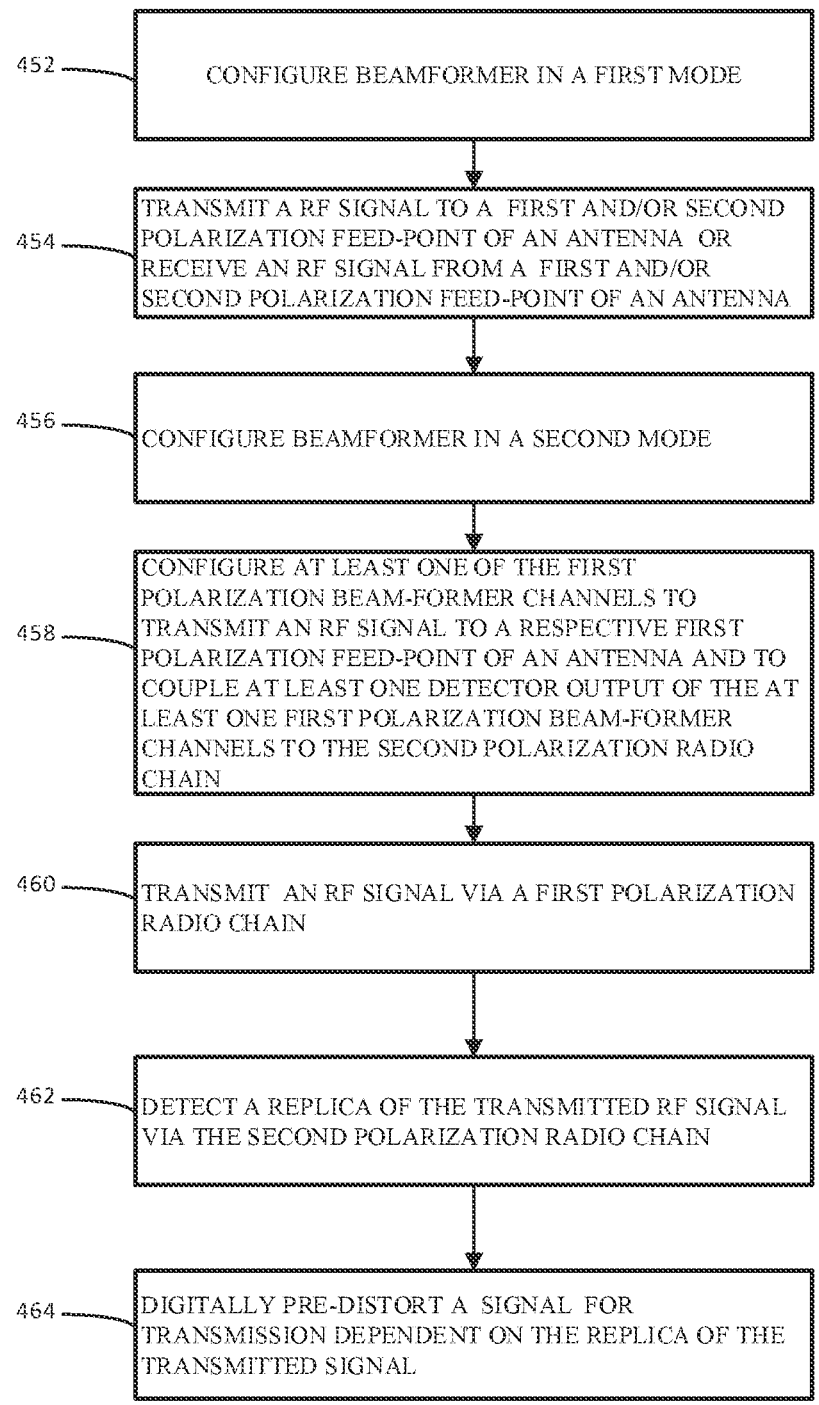
FIG. 6 shows a method of operating a multiple-input-multiple output (MIMO) antenna system according to an embodiment.

FIG. 6 shows a method of operating a MIMO antenna system 450. In step 452 a beamformer is configured in a first mode. In step 454, a RF signal is transmitted to a first and/or second polarization feed-point of an antenna or an RF signal is received from a first and/or second polarization feed-point of an antenna. In step 456 a beamformer is configured in a second mode. In step 458, at least one of the first polarization beamformer channels is configured to transmit an RF signal to a respective first polarization feed-point of an antenna and to couple at least one detector output of the at least one first polarization beamformer channels to the second polarization radio chain. In step 460 an RF signal is transmitted via a first polarization radio chain. In step 462 a replica of the transmitted signal is detected via the second polarization radio chain. In step 464, a signal may be digitally pre-distorted for transmission dependent on the detected replica of the transmitted signal.

Figure 7:
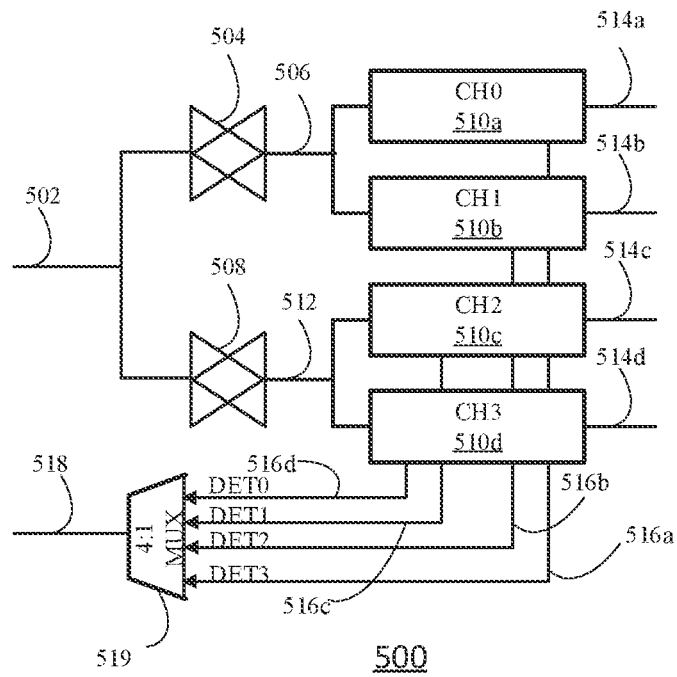
FIG. 7 shows an example of a beamformer including multiple channels with detectors as used in FIG. 1.

FIG. 7 shows an example implementation of beamformer channels 500 which may for example be used to implement beamformer channels 148a, 148b. In this example four channels 510a, 510b, 510c, 510d are shown but in other examples there may be fewer or more channels. Each of the channels 510a-d has a corresponding detector output 516a-d connected to a 4-to-1 multiplexer 519. The output of the multiplexer is connected to the detector output 518 for example corresponding to detector outputs 226a, 226b. Each of the channels 510a-d has a corresponding antenna connection 514a-d corresponding to connections 150a, 150b, 250a, 250b, 550a, 350b. Radio chain connection 502 may be connected to bidirectional buffers 504, 508. A first bidirectional buffer 504 may have a connection 506 to a first beamformer channel 510a and a second beamformer channel 510b. A second bidirectional buffer 508 may have a connection 512 to a third beamformer channel 510c and a fourth beamformer channel 510b.

During operation in a transmit mode, the signal received from the radio chain is provided to each of the beamformer channels 510a-d and output on the respective antenna connection terminals 514a-d. Detection signals DETO-3 are provided by detector outputs 516a-d to multiplexer 519. The multiplexer 519 can be controlled to select which signal is output to the detector output 518.

Figure 8:
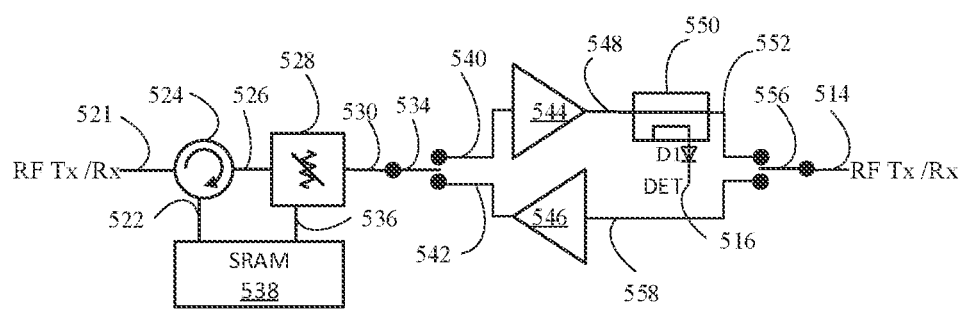
FIG. 8 shows a typical implementation of a channel in a beamformer.

FIG. 8 shows an example implementation of a beamformer channel 520. Bidirectional RF connection 521 is connected to phase shifter 524. The phase shifter 524 is connected via connection 526 to an attenuator 528. Phase shifter 522 has a control input 522 connected to SRAM 538. Attenuator 528 has a control input 536 connected to SRAM 538. SRAM 538 is used to store gain and shift parameter values (bits).

A first select switch 534 has a RF connection 530 connected to the attenuator 528, a second terminal 540 connected to an input of a transmitter amplifier 544 and a third terminal connected to the receiver amplifier output 542. The transmitter amplifier output 548 is connected to a power detector 550 which typically has includes a coupler and diode D1. The detector output 516 is connected to the anode of the diode. The main signal is routed through the power detector 550 to a first terminal 552 of a second select switch 556. A second terminal 558 is connected to an input of the receiver amplifier 546. A third terminal is connected to the antenna connection 514. First and second select switches 534, 556 are controlled by controller (not shown) to configure the beamformer channel to either transmit an RF signal received at RF connection 530 to the antenna via antenna connection 514 or to receive a signal via antenna connection 514 and transmit the received signal via RF connection 530. First and second select switches 534, 556 may for example be implemented using NMOS transistors and may also be considered as multiplexers.

In operation in a transmit mode, the first select switch 534 and second select switch 556 are controlled by the controller (not shown) to connect the attenuator 528 to the input of the transmitter amplifier 544 and the transmitter amplifier output 548 to connect to the antenna connection 514 via power detector 550. In a receive mode, the first select switch 534 and second select switch 556 are controlled by the controller (not shown) to connect the attenuator 528 to the receiver amplifier output 542 and the antenna connection 514 to the input of the receiver amplifier 546.

A multiple-input multiple-output (MIMO) antenna system for a mobile cellular network and method is described. The MIMO antenna system includes an array of dual-polarization patch antennas each having first and second polarization feed-points, a first polarization radio chain and a second polarization radio chain. The MIMO antenna system includes a beamformer coupled to the first and second polarization radio chains. The beamformer includes a beamformer channel for a respective feedpoint and further includes a transmit amplifier and a detector (coupler) coupled to a transmit amplifier output. In one mode of operation, a signal is transmitted via the first polarization feed-point of a dual-polarisation patch antennas and a replica of the transmitted signal may be sensed using the coupler at the output of the transmit amplifier and routed via the second polarization radio chain to a digital predistortion module. The digital pre-distortion module is configured to digitally pre-distort a signal for transmission dependent on the replica of the RF signal.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A multiple-input multiple-output, MIMO, antenna system for a mobile cellular network, the antenna system comprising:
   an array of dual-polarized antennas, each dual-polarized antenna having a first polarization feed-point and a second polarization feed-point;
   a first polarization radio chain;
   a second polarization radio chain;
   a beamformer coupled to the first and second polarization radio chains, the beamformer having a plurality of first polarization beamformer channels and second polarization beamformer channels, each of the first polarization beamformer channels coupled to a first polarization feed-point of a respective dual-polarization antenna and each of the second polarization beamformer channels coupled to a second polarization feed-point of the respective dual-polarization antenna, wherein each beamformer channel comprises a transmit amplifier and a detector coupled to a transmit amplifier output; and wherein the MIMO antenna system further comprises:
   a digital pre-distortion module coupled to the first and second polarization radio chains; and
   a controller having a control output coupled to the beamformer; and wherein the controller is operable to control the beamformer in a first mode to:
   configure the beamformer to transmit or receive an RF signal via the respective first and second polarization feed-points; and in a second mode to:
   configure at least one first polarization beamformer channel to transmit an RF signal to a respective first polarization feed-point and to couple a detector output of the at least one first polarization beamformer channel to the second polarization radio chain;
   transmit an RF signal via the first polarization radio chain;
   detect a replica of the RF signal via the second polarization radio chain;
   and wherein the digital pre-distortion module is configured to digitally pre-distort a signal for transmission dependent on the replica of the RF signal.

2. The MIMO system of claim 1 configured as a time-division duplex, TDD, MIMO system and wherein the beamformer is configured in the first mode during a TDD time-slot and in the second mode in a guard band interval between TDD time-slots.

3. The MIMO antenna system of claim 1 wherein
   the transmit amplifier has a transmitter amplifier input configured to be switchably coupled to a respective one of the first polarization radio chain and the second polarization radio chain, and the transmitter amplifier output is configured to be switchably coupled to a respective one of the first polarization feed-point and the second polarization feed-point; and
   each beamformer channel further comprises:
   a receiver amplifier having a receiver amplifier input configured to be switchably coupled to a respective one of the first polarization feed-point and the second polarization feed-point and a receiver amplifier output configured to be switchably coupled to a respective one of the first polarization radio chain and the second polarization radio chain.

4. The MIMO antenna system of claim 1 wherein the first polarization and the second polarization directions are mutually orthogonal.

5. The MIMO antenna system of claim 1 wherein the first polarization is one of a horizontal polarization and vertical polarization and the second polarization is the other of the horizontal polarization and the vertical polarization.

6. The MIMO antenna system of claim 1 wherein each beamformer channel further comprises a first switch arranged to switchably couple the respective radio chain to either the transmitter amplifier input or the receiver amplifier output.

7. The MIMO antenna system of claim 1 wherein each beamformer channel further comprises a second switch arranged to switchably couple either the transmitter amplifier output or the receiver amplifier input to a respective one of the first polarization feed-point and the second polarization feed-point.

8. The MIMO antenna system of claim 1 further comprising a further detection switch configured to switchably couple the second polarization radio chain to either the plurality of second polarization beamformer channels or a detection output of the first polarization beamformer channels.

9. The MIMO antenna system of claim 1 wherein each of the first and second polarization radio chains comprise a series arrangement of an up-down converter and a splitter between the digital predistortion module and the beamformer; wherein in a transmit mode, the up-down converter is configured to up-convert a signal from the controller and the splitter is configured to split the up-converted signal and provide the up-converted signal to the beamformer and in a receive mode, the splitter is configured to combine signals received from the beamformer and provide the combined signal to the up-down converter; and the up-down converter is configured to down-convert the combined signal.

10. The MIMO antenna system of claim 1 further comprising a digital front-end including the controller and further comprising a first and second polarization digital to analog converter and a first and second polarization analog to digital converter arranged between the controller and the respective first and second polarization radio chains.

11. The MIMO antenna system of claim 1 wherein the digital pre-distortion module comprises a digital input configured to receive a signal for transmission by the antenna system and a digital output configured to output a signal detected by the antenna system.

12. The MIMO antenna system of claim 1 wherein during the second mode the digital pre-distortion module is further configured to: output a signal to the first polarization radio chain, and to receive an input signal from the second polarisation radio chain.

13. A method of operating a multi-input multi-output, MIMO, antenna system for a mobile cellular network, the antenna system comprising:
an array of dual-polarized antennas, each dual-polarized antenna having a first polarization feed-point and a second polarization feed-point:
a first polarization radio chain;
a second polarization radio chain;
a beamformer coupled to the first and second polarization radio chains, the beamformer having a plurality of first polarization beamformer channels and second polarization beamformer channels, each of the first polarization beamformer channels coupled to a first polarization feed-point of a respective dual-polarization antenna and each of the second polarization beamformer channels coupled to a second polarization feed-point of the respective dual-polarization antenna, and each of the first and second polarization beamformer channels comprising a transmit amplifier and a detector coupled to a transmit amplifier output;
a digital predistortion module coupled to the first and second polarization radio chains; and wherein the method comprises:
in a first mode configuring the beamformer to either a transmit an RF signal to the respective first and second polarization feed-points or receive an RF signal from the respective first and second polarization feed-points, and in a second mode:
configuring at least one of the first polarization beamformer channels to transmit an RF signal to the respective first polarization feed-point and to couple at least one detector output of the at least one first polarization beamformer channels to the second polarization radio chain;
transmitting an RF signal via the first polarization radio chain;
detecting a replica of the RF signal via the second polarization radio chain; and
digitally pre-distorting a signal for transmission dependent on the replica of the RF signal.

14. The method of claim 13 further comprising configuring the MIMO antenna system as a time-division duplex, TDD, MIMO antenna system; and
configuring the beamformer in the first mode during a TDD time-slot; and
configuring the beamformer in the second mode during a guard band interval between TDD time-slots.

15. The method of claim 14 further comprising, in the second mode:
transmitting an RF signal via the first polarization radio chain;
detecting a replica of the RF signal via the second polarization radio chain.

16. The MIMO antenna system of claim 2 wherein
the transmit amplifier has a transmitter amplifier input configured to be switchably coupled to a respective one of the first polarization radio chain and the second polarization radio chain, and the transmitter amplifier output is configured to be switchably coupled to a respective one of the first polarization feed-point and the second polarization feed-point; and
each beamformer channel further comprises:
a receiver amplifier having a receiver amplifier input configured to be switchably coupled to a respective one of the first polarization feed-point and the second polarization feed-point and a receiver amplifier output configured to be switchably coupled to a respective one of the first polarization radio chain and the second polarization radio chain.

17. The MIMO antenna system of claim 3 wherein the first polarization and the second polarization directions are mutually orthogonal.

18. The MIMO antenna system of claim 3 wherein the first polarization is one of a horizontal polarization and vertical polarization and the second polarization is the other of the horizontal polarization and the vertical polarization.

19. The MIMO antenna system of claim 3 wherein each beamformer channel further comprises a first switch arranged to switchably couple the respective radio chain to either the transmitter amplifier input or the receiver amplifier output.

20. The MIMO antenna system of claim 3 wherein each beamformer channel further comprises a second switch arranged to switchably couple either the transmitter amplifier output or the receiver amplifier input to a respective one of the first polarization feed-point and the second polarization feed-point.

* * * * *